(12) United States Patent
Leung et al.

(10) Patent No.: US 7,881,534 B2
(45) Date of Patent: Feb. 1, 2011

(54) COLLECTING AND UTILIZING USER CORRECTION FEEDBACK TO IMPROVE HANDWRITING RECOGNITION

(75) Inventors: Brian Leung, Bellevue, WA (US); Michael Revow, Bellevue, WA (US); Richard K. Sailor, Brier, WA (US)

(73) Assignee: Microsoft Corporation, Redmond, WA (US)

(*) Notice: Subject to any disclaimer, the term of this patent is extended or adjusted under 35 U.S.C. 154(b) by 1051 days.

(21) Appl. No.: 11/455,874

(22) Filed: Jun. 19, 2006

(65) Prior Publication Data

US 2007/0292031 A1    Dec. 20, 2007

(51) Int. Cl.
- *G06K 9/18* (2006.01)
- *G06K 9/00* (2006.01)
- *G06K 9/72* (2006.01)
- *G10L 15/00* (2006.01)

(52) U.S. Cl. .................... 382/186; 382/187; 382/189; 382/229; 704/231; 704/251

(58) Field of Classification Search ......... 382/181–231; 704/231–270; 715/224–226; 707/1–10; 700/90, 104
See application file for complete search history.

(56) References Cited

U.S. PATENT DOCUMENTS

| | | | |
|---|---|---|---|
| 5,392,363 A | 2/1995 | Fujisaki et al. | |
| 5,544,260 A | 8/1996 | Chefalas et al. | |
| 5,555,317 A | 9/1996 | Anderson | |
| 5,896,321 A * | 4/1999 | Miller et al. ........... | 365/189.15 |
| 5,917,942 A | 6/1999 | Ehsani et al. | |
| 6,005,973 A | 12/1999 | Seybold et al. | |
| 6,208,755 B1 | 3/2001 | Mori et al. | |
| 7,209,951 B2 * | 4/2007 | Goldberg ................. | 709/206 |
| 7,610,194 B2 * | 10/2009 | Bradford et al. ........... | 704/10 |
| 2002/0085772 A1 | 7/2002 | Lee | |
| 2003/0088410 A1 | 5/2003 | Geidl et al. | |
| 2005/0128181 A1 | 6/2005 | Wang | |
| 2005/0171783 A1 | 8/2005 | Suominen | |
| 2005/0171926 A1 | 8/2005 | Thione et al. | |

(Continued)

OTHER PUBLICATIONS

"Error Repair in Human Handwriting - An Intelligent User Interface for Automatic On-Line Handwriting Recognition", Wolfgang Hürst, Jie Yang and Alex Waibel, IEEE International Joint Symposia on Intelligence and Systems, May 21-23, 1998, pp.389-395.

(Continued)

*Primary Examiner*—Tom Y Lu
*Assistant Examiner*—Thomas A Conway

(57) ABSTRACT

Various technologies and techniques are disclosed for using user corrections to help improve handwriting recognition operations. The system tracks user corrections to recognition results. The system receives handwritten input from the user and performs a recognition operation to determine a top recognized word. The prior corrections made by the user are analyzed to calculate a ratio of times the user has corrected the top recognized word to a particular other word as opposed to correcting the particular other word to the top recognized word. If the ratio meets or exceeds a required minimum, then at least one secondary source is optionally analyzed to determine if the particular other word is used a certain number of times more frequently than the top recognized word in the secondary source. The system performs a swap of the top recognized word with the particular other word when the required criteria are met.

13 Claims, 12 Drawing Sheets

U.S. PATENT DOCUMENTS

2005/0192802 A1 9/2005 Robinson et al.

OTHER PUBLICATIONS

"Designing a User-Driven Method to Improve Handwriting Recognition on a Tablet PC", Susan Dziadosz, Ant Je Helfrich, Rive Citron and Arine Lund, A workshop presentation at the a9th British computer Society HCI Group Annual conference, Edinburgh, Scotland, Sep. 5-9, 2005, 9 pgs.

"Handwriting Recognition Improvement in Microsoft Windows XP Tablet PC Edition Service Pack 2", Li Lu-Porter and Antje Helfrich, Windows XP Table PC Edition 2005, Technical Articles, 4 pgs., Reprinted from the Internet at: http://msdn.microsoft.com/en-us/library/ms812485.aspx.

* cited by examiner

COLLECTING AND UTILIZING USER CORRECTION FEEDBACK TO IMPROVE HANDWRITING RECOGNITION

BACKGROUND

Handwriting recognition systems on devices such as Tablet PC's or Pocket PC's employ a machine learning model such as a neural network. Achieving good "walkup accuracy" for the large variety of writing styles requires the collection of handwriting samples from many individuals with a large variety handwriting styles. The samples in turn are used to train a handwriting recognizer. Such a recognizer will perform well for popular styles, but less well for less common or unusual handwriting styles which may frequently require the user to make corrections to the recognition result.

SUMMARY

Various technologies and techniques are disclosed for using user corrections to help improve handwriting recognition operations. The system tracks user corrections to recognition results. The system receives handwritten input from the user and performs a recognition operation to determine a top recognized word. The prior corrections made by the user are analyzed to calculate a ratio of times the user has corrected the top recognized word to a particular other word as opposed to correcting the particular other word to the top recognized word. If the ratio meets or exceeds a required minimum, then at least one secondary source is optionally analyzed to determine if the particular other word is used a certain number of times more frequently than the top recognized word in the secondary source. The system performs a swap of the top recognized word with the particular other word when the required criteria are met.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
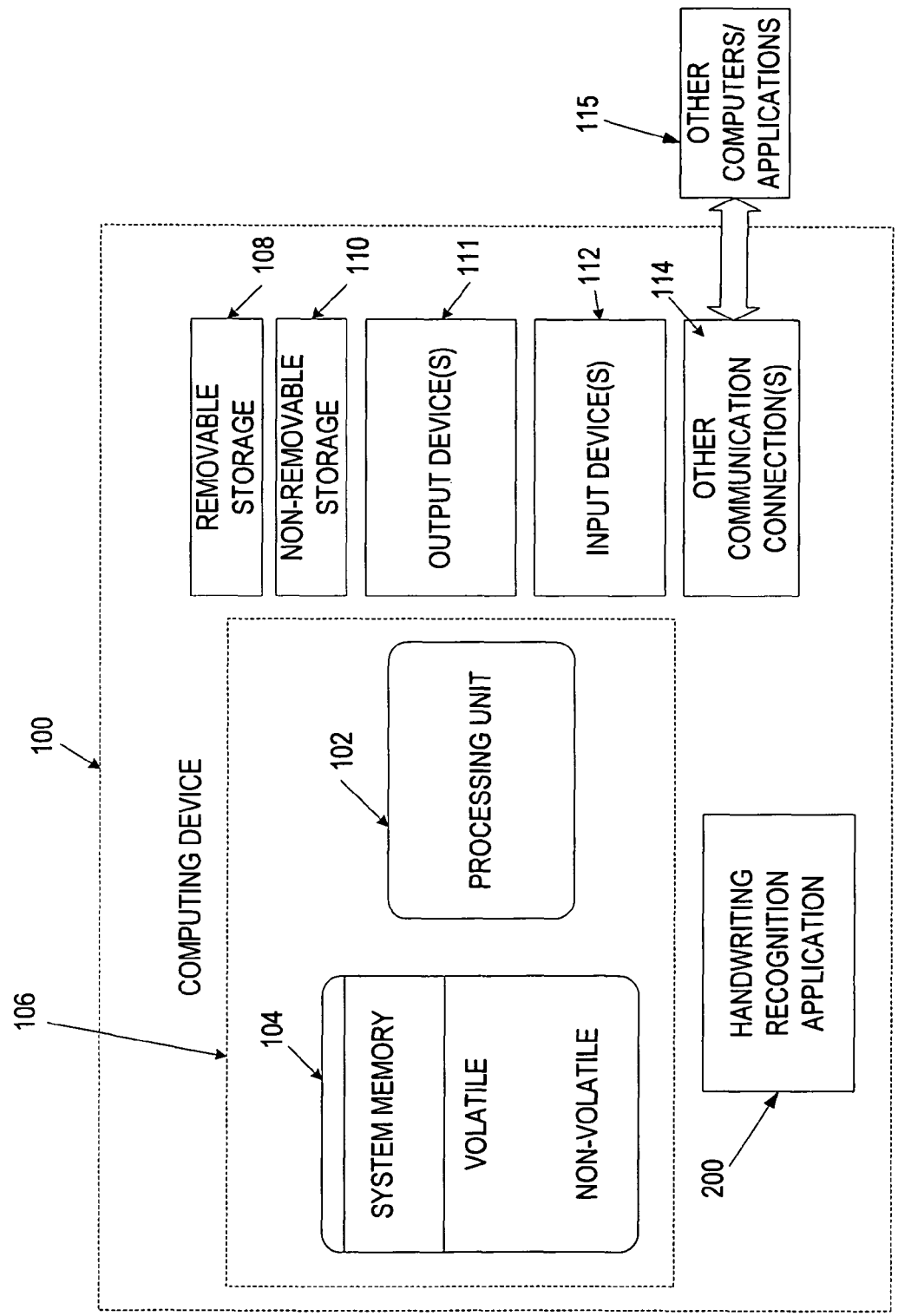
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that performs handwriting recognition, but the system also serves other purposes in addition to these. In one implementation, one or more of the techniques described herein can be implemented as features within a handwriting recognition program, or from any other type of program or service that allows a user to input handwritten input. In one implementation, the system tracks a user's corrections to handwriting recognition results and uses the correction history to improve future recognitions.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes handwriting recognition application 200. Handwriting recognition application 200 will be described in further detail in FIG. 2.

Figure 2:
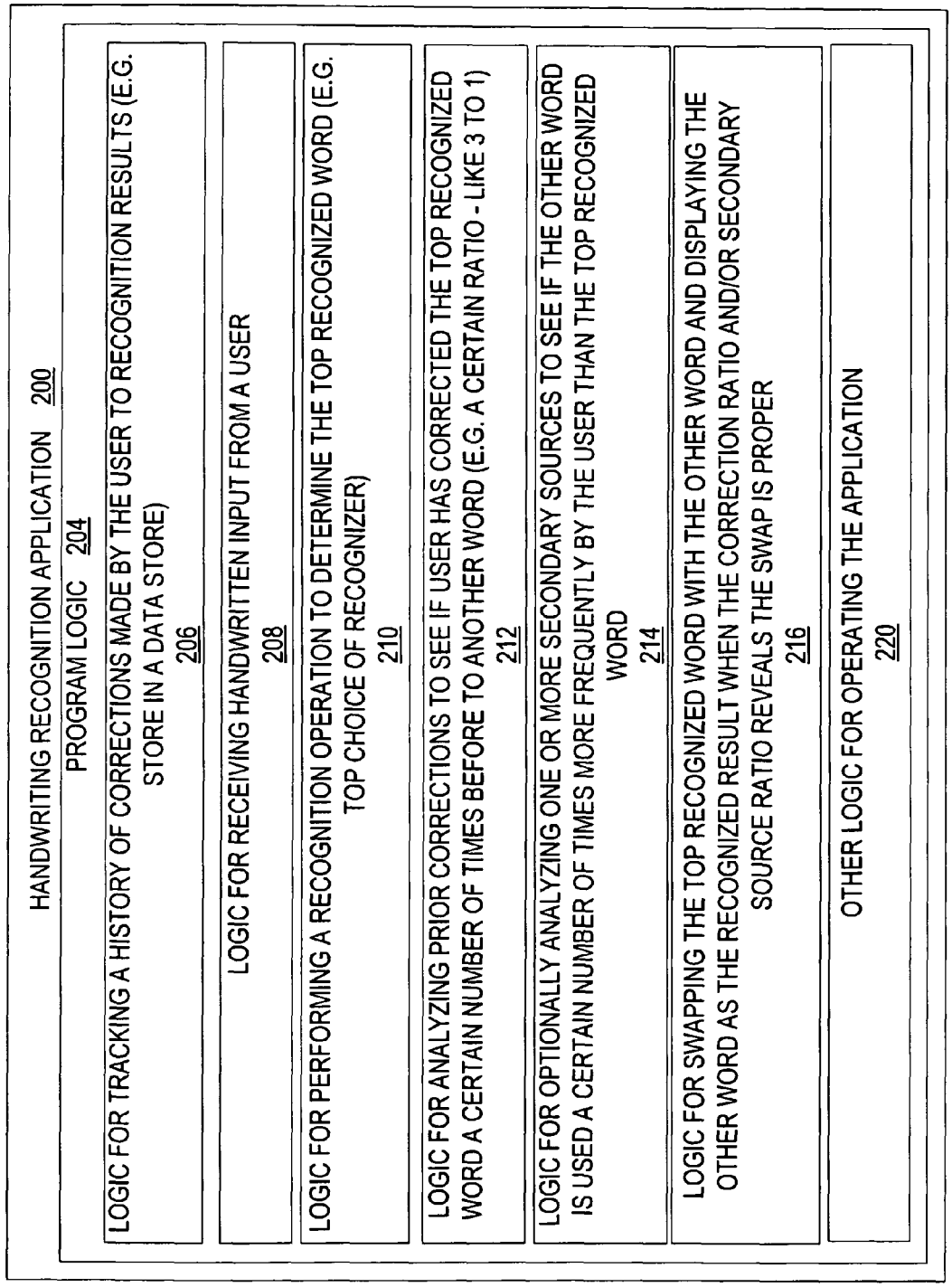
FIG. 2 is a diagrammatic view of a handwriting recognition application of one implementation operating on the computer system of FIG. 1.

Turning now to FIG. 2 with continued reference to FIG. 1, a handwriting recognition application 200 operating on computing device 100 is illustrated. Handwriting recognition application 200 is one of the application programs that reside on computing device 100. However, it will be understood that handwriting recognition application 200 can alternatively or additionally be embodied as computer-executable instructions on one or more computers and/or in different variations than shown on FIG. 1. Alternatively or additionally, one or more parts of handwriting recognition application 200 can be part of system memory 104, on other computers and/or applications 115, or other such variations as would occur to one in the computer software art.

Handwriting recognition application 200 includes program logic 204, which is responsible for carrying out some or all of the techniques described herein. Program logic 204 includes logic for tracking a history of corrections made by the user to recognition results (e.g. store in a data store) 206; logic for receiving handwritten input from a user 208; logic for performing a recognition operation to determine the top recognized word (e.g. top choice of recognizer) 210; logic for analyzing prior corrections to see if user has corrected the top recognized word a certain number of times before to another word (e.g. a certain ratio—like 3 to 1) 212; logic for optionally analyzing one or more secondary sources to see if the other word is used a certain number of times more frequently by the user than the top recognized word 214; logic for swapping the top recognized word with the other word and displaying the other word as the recognized result when the correction ratio and/or secondary source ratio reveals the swap is proper 216; and other logic for operating the application 220. In one implementation, program logic 204 is operable to be called programmatically from another program, such as using a single call to a procedure in program logic 204.

Figure 3:
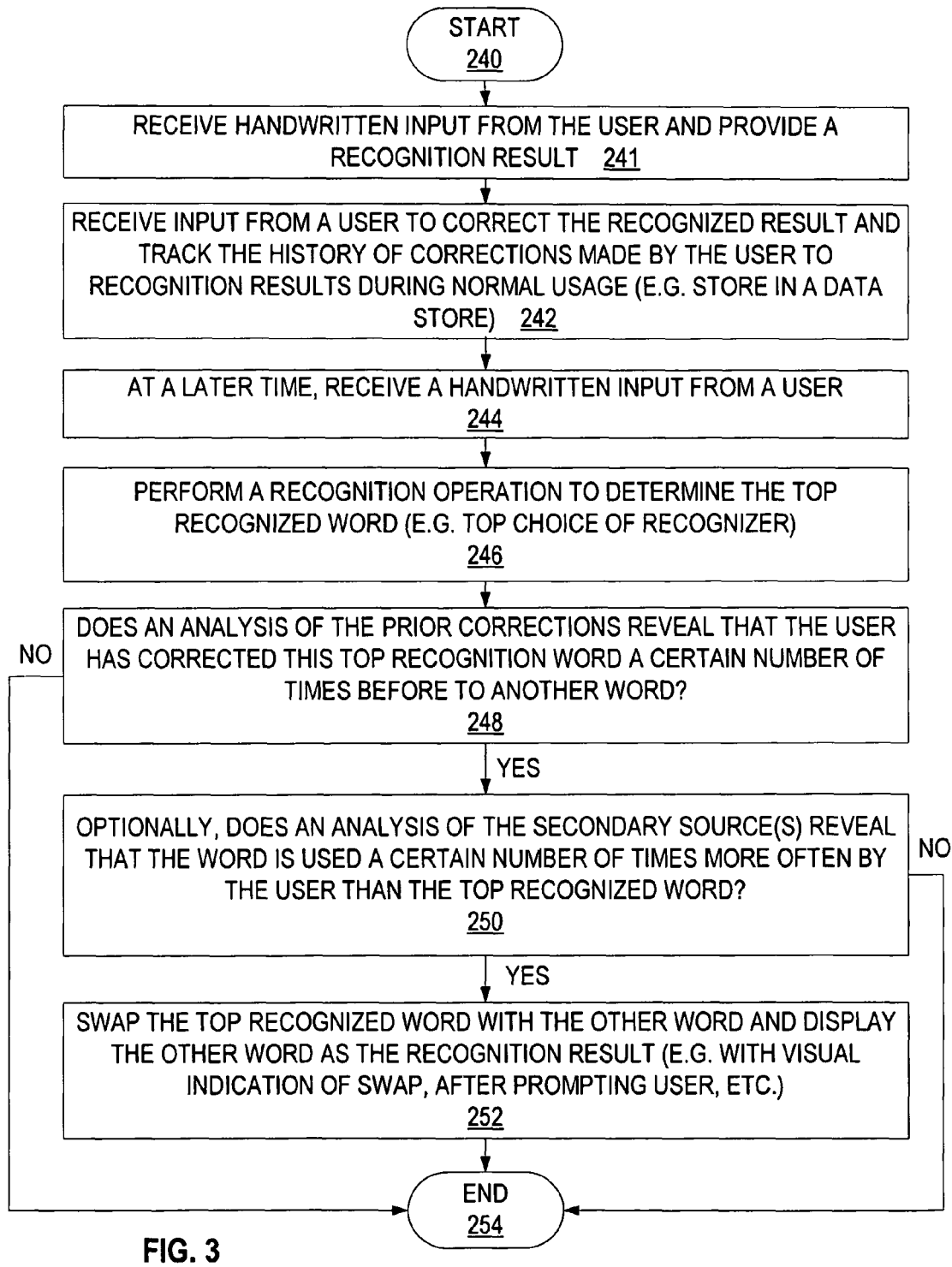
FIG. 3 is a high-level process flow diagram for one implementation of the system of FIG. 1.

Turning now to FIGS. 3-7 with continued reference to FIGS. 1-2, the stages for implementing one or more implementations of handwriting recognition application 200 are described in further detail. FIG. 3 is a high level process flow diagram for handwriting recognition application 200. In one form, the process of FIG. 3 is at least partially implemented in the operating logic of computing device 100. The procedure begins at start point 240 with receiving handwritten input from a user and providing a recognized result (stage 241). The system then receives input from the user to correct the recognized result and tracks the history of corrections (e.g. this and any later corrections) made by the user to recognition results during normal usage (e.g. store in a data store) (stage 242). At a later time, handwritten input is received from a user (stage 244). A recognition operation is performed by the handwriting recognizer to determine the top recognized word (e.g. top choice of recognizer) (stage 246). The system analyzes the prior corrections to see if the user has corrected this top recognition word a certain number of times before to another word (decision point 248). If not, then the process ends at end point 254 (with no swap).

If such corrections have been made before (decision point 248), the system analyzes one or more secondary source(s) to see if the other word is used a certain number of times more often by the user than the top recognized word (decision point 250). In one implementation, if both criteria are met (the top recognized word has been corrected a certain number of times to the other word and the secondary source reveals that the other word is used a certain number of times more often), then the system swaps the top recognition choice with the other word (stage 252). In another implementation, if just the first criteria is met (the top recognized word has been corrected a certain number of times to the other word), then the system swaps the top recognized word with the other word (stage 252). In yet another implementation, the counts from the prior correction history and/or secondary sources are fed to a decision making system (such as a neural network) to make the determination on whether a swap should be made or not. After the swap is made, however it was decided, the other word is displayed on the display device as the recognition result, such as with a visual indication of a swap, after prompting the user, automatically, etc. (stage 252). The process ends at end point 254.

Figure 4:
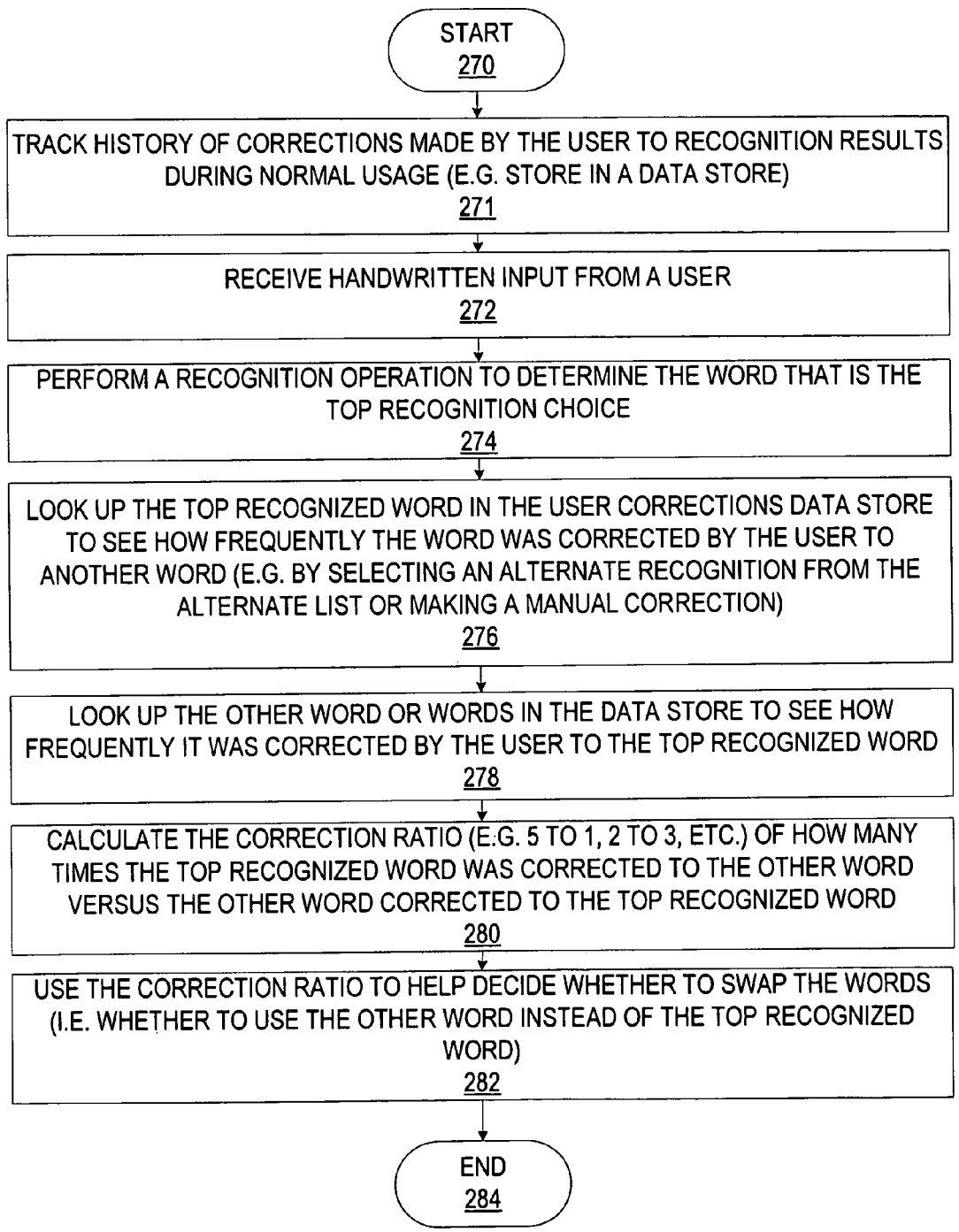
FIG. 4 is a process flow diagram for one implementation of the system of FIG. 1 illustrating the stages involved in analyzing a prior history of a user's corrections to help determine a proper recognition result.

FIG. 4 illustrates one implementation of the stages involved in analyzing a prior history of a user's corrections to help determine a proper recognition result. In one form, the process of FIG. 4 is at least partially implemented in the operating logic of computing device 100. The procedure begins at start point 270 with tracking the history of corrections made by the user to recognition results during normal usage (e.g. store in a data store) (stage 271). Handwritten input is received from a user (stage 272). A recognition operation is performed to determine the word that is the top recognition choice (stage 274). The top recognized word is looked up in the user corrections data store to see how frequently the word was corrected by the user to another word (e.g. by selecting an alternate recognition from the alternate list or making a manual correction) (stage 276). The other word (or words) is looked up in the data store to see how frequently it was corrected by the user to the top recognized word (stage 278). The system calculates the correction ratio (e.g. 5 to 1, 2 to 3, etc.) of how many times the top recognized word was corrected to the other word versus the other word corrected to the top recognized word (stage 280). The correction ratio is used to help the system decide whether to swap the words (i.e. whether to use the other word instead of the top recognized word) (stage 282). The process ends at end point 284.

Figure 5:
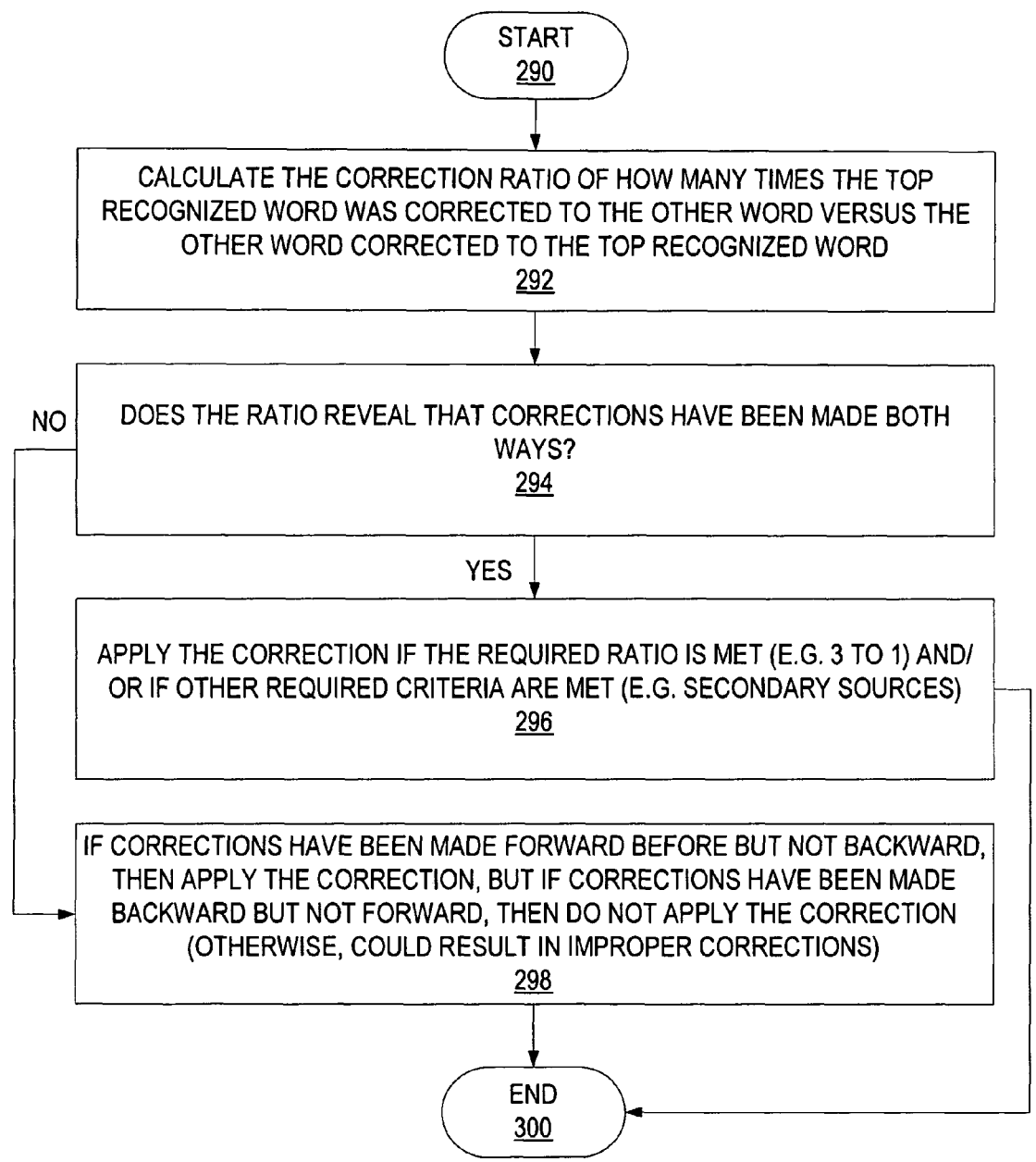
FIG. 5 is a process flow diagram for one implementation of the system of FIG. 1 illustrating the stages involved in calculating and analyzing the correction ratio to help determine a proper recognition result.

FIG. 5 illustrates one implementation of the stages involved in calculating and analyzing the correction ratio to help determine a proper recognition result. In one form, the process of FIG. 5 is at least partially implemented in the operating logic of computing device 100. The procedure begins at start point 290 with calculating the correction ratio of how many times the top recognized word was corrected to the other word versus the other word corrected to the top recognized word (stage 292). If the correction ratio reveals that the corrections have been made both ways (decision point 294), then the system applies the correction if the required ratio is met (e.g. a minimum of 3 to 1, etc.) and/or if other required criteria are met (e.g. secondary sources meeting certain ratio) (stage 296). If corrections have been made forward before (e.g. from the top recognized word to the other word) but not backward (the other way around), then the system applies the correction (stage 298). For example, in such an instance, the correction ratio (e.g. 3 to 1, etc.) is trivially satisfied (because n/0>3/1, for n>0), and thus the correction is applied (stage 298). However, if corrections have been made backward before (e.g. from the other word to the top recognized word) but not forward, then the system does not apply the correction (e.g. otherwise, an improper correction could result) (stage 298). In such an instance, the correction ratio (e.g. 3 to 1, etc.) is not satisfied (because 0/n<3/1), and thus the system does not apply the correction (stage 298). The process ends at end point 300.

Figure 6:
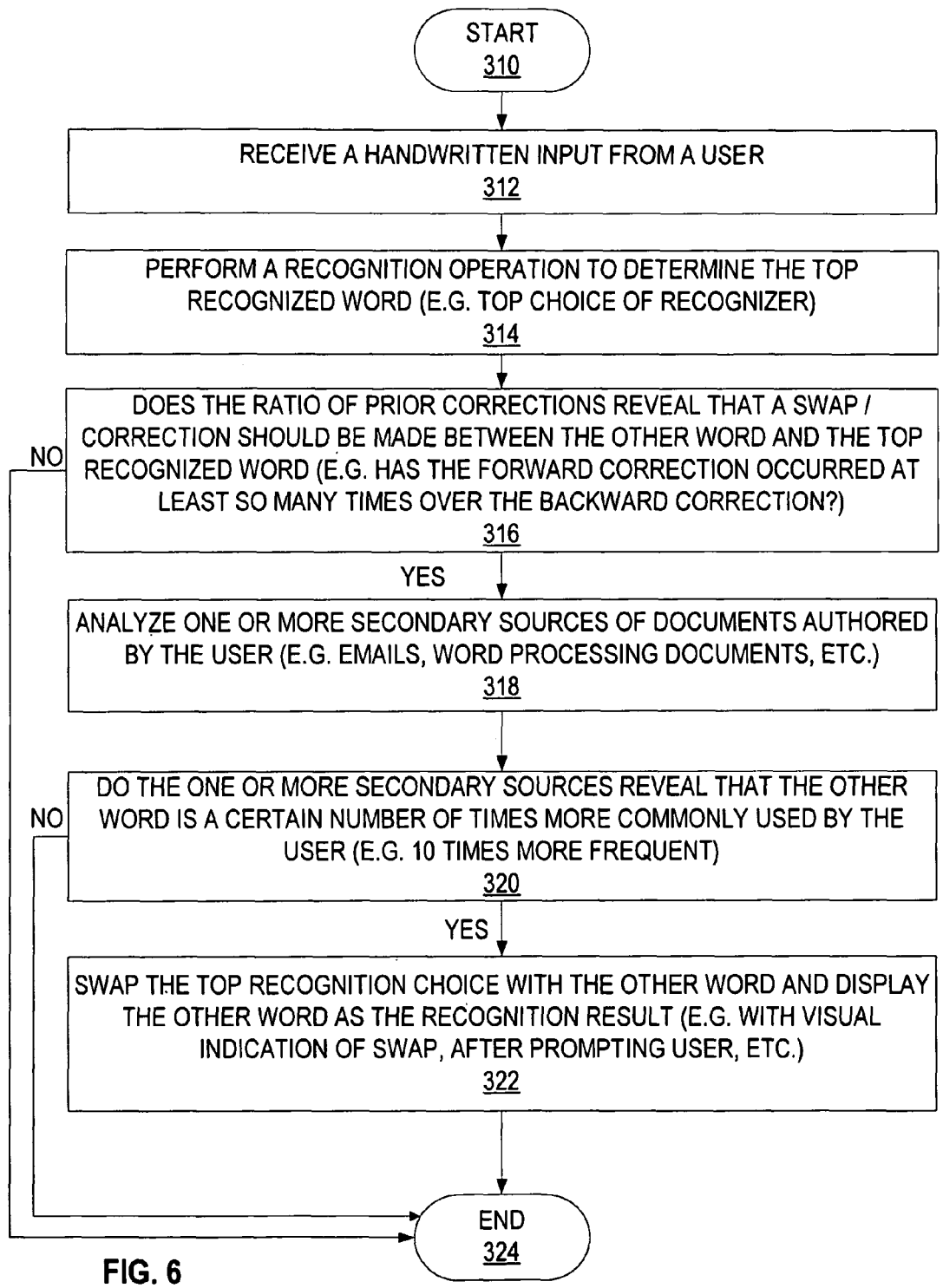
FIG. 6 is a process flow diagram for one implementation of the system of FIG. 1 illustrating the stages involved in analyzing one or more secondary sources to help determine a proper recognition result.

FIG. 6 illustrates one implementation of the stages involved in analyzing one or more secondary sources to help determine a proper recognition result. In one form, the process of FIG. 6 is at least partially implemented in the operating logic of computing device 100. The procedure begins at start point 310 with receiving a handwritten input from a user (stage 312). A recognition operation is performed to determine the top recognized word (e.g. the top choice of recognizer) (stage 314). The system determines whether the ratio of the prior corrections reveals that a swap/correction should be made between the other word and the top recognized word (e.g. has the forward correction occurred at least so many times over the backward correction) (decision point 316). If not (decision point 316), then the process ends at end point 324 with no swap occurring. If so (decision point 316), then the system analyzes one or more secondary sources of documents authored by the user (e.g. emails, word processing documents, etc.) (stage 318). The system determines if the one or more secondary sources reveal that the other word is a certain number of times more commonly used by the user (e.g. 10 times more frequently) (decision point 320). If not (decision point 320), then the process ends at end point 324 with no swap occurring. If so (decision point 320), then the system swaps the top recognition choice with the other word and displays the other word as the recognition result (e.g. with visual indication of swap, after prompting user, automatically, etc.) (stage 322). The process ends at end point 324.

Figure 7:
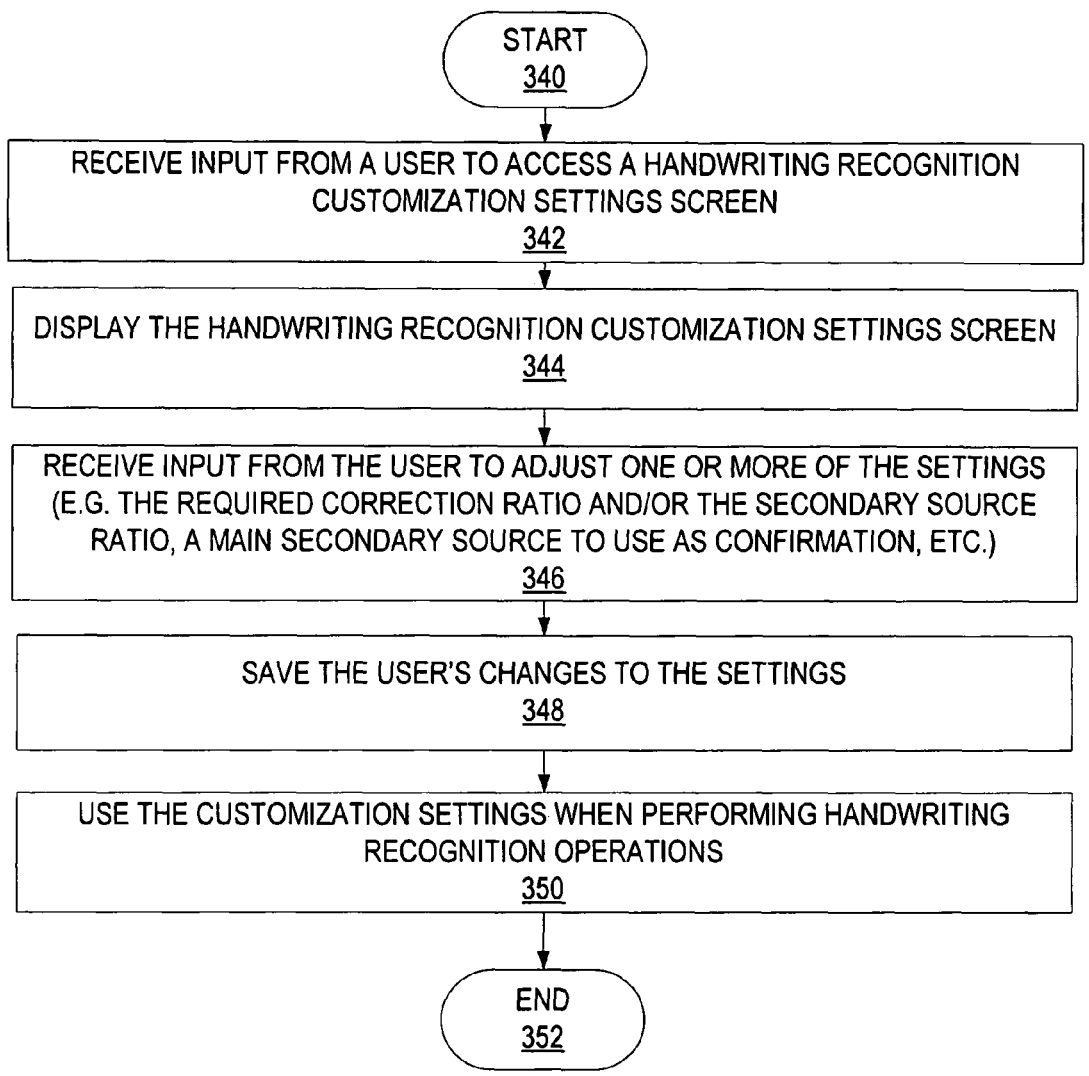
FIG. 7 is a process flow diagram for one implementation of the system of FIG. 1 that illustrates the stages involved in allowing a user to customize the required correction ratio and/or the secondary source ratio.

FIG. 7 illustrates one implementation of the stages involved in allowing a user to customize the required correction ratio and/or the secondary source ratio. In one form, the process of FIG. 7 is at least partially implemented in the operating logic of computing device 100. The procedure begins at start point 340 with receiving input from a user to access a handwriting recognition customization settings screen (stage 342). The handwritten recognition customization settings screen is displayed to the user (stage 344). The system receives input from the user to adjust one or more of the settings (e.g. the required correction ratio, the secondary source ratio, and/or a main secondary source to use as confirmation, etc.) (stage 346). The system saves the user's changes to the settings (stage 348). The customization settings are used when performing handwriting recognition operations to determine whether swaps should occur (stage 350). The process ends at end point 352.

Turning now to FIGS. 8-12, simulated screens are shown to illustrate allowing a user to make corrections and have those corrections used by the recognizer in later operations to improve the recognition results. These screens can be displayed to users on output device(s) 111. Furthermore, these screens can receive input from users from input device(s) 112.

Figure 8:
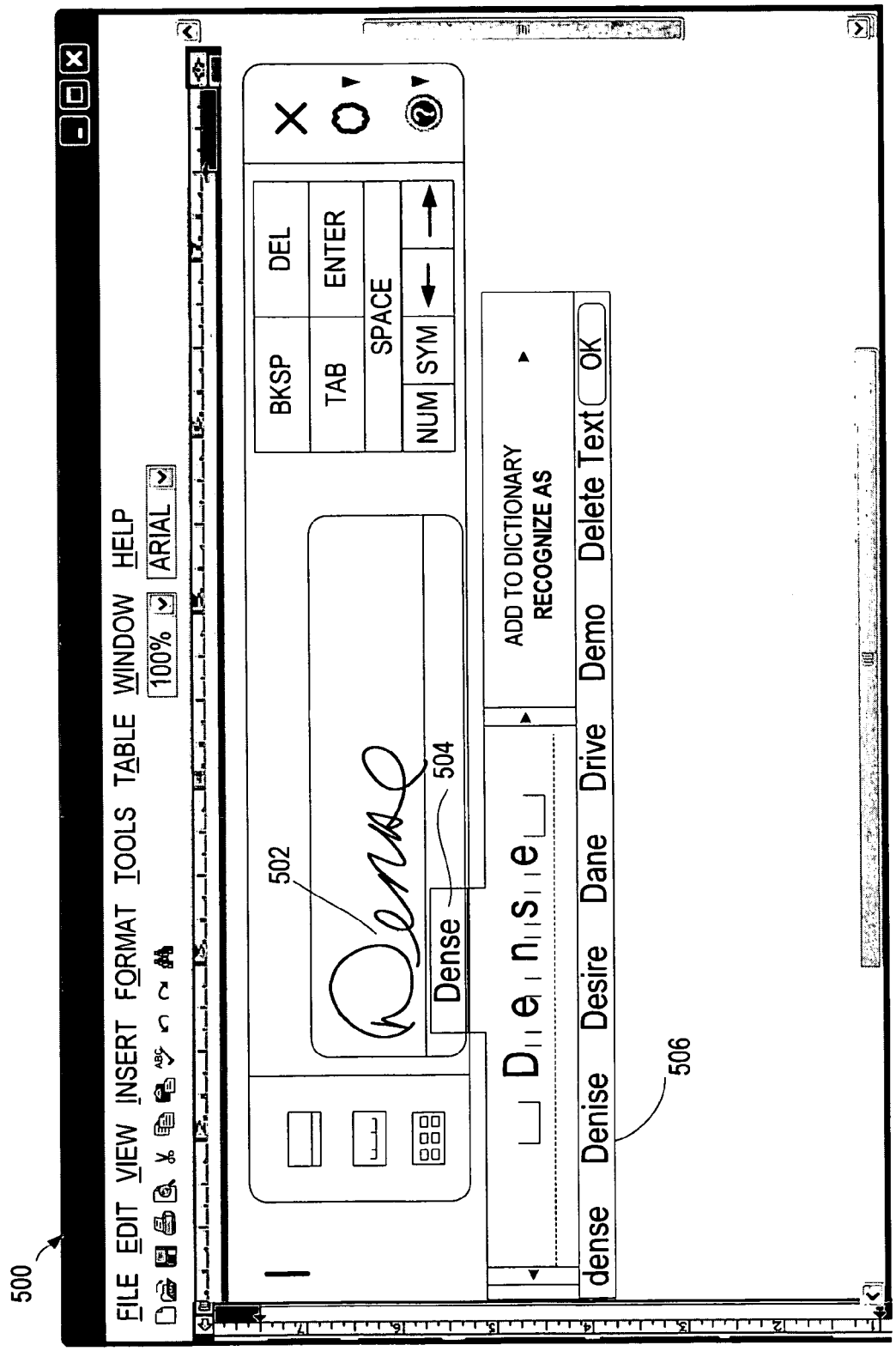
FIG. 8 is a simulated screen for one implementation of the system of FIG. 1 that illustrates performing a correction of an incorrect recognition result by selecting an alternate.

FIG. 8 shows a simulated screen 500 that appears in one implementation when the user performs a correction of an incorrect recognition result by selecting an alternate. When the user entered "Denise" 502 in the input panel, the top recognized word returned by the recognizer was "Dense" 504. The user selected the option to correct "Dense" 504 to "Denise" 506 by selecting "Denise" 506 from the displayed list of alternates. Upon making this correction, the system saves the user's correction for use in future recognition decisions.

Figure 9:
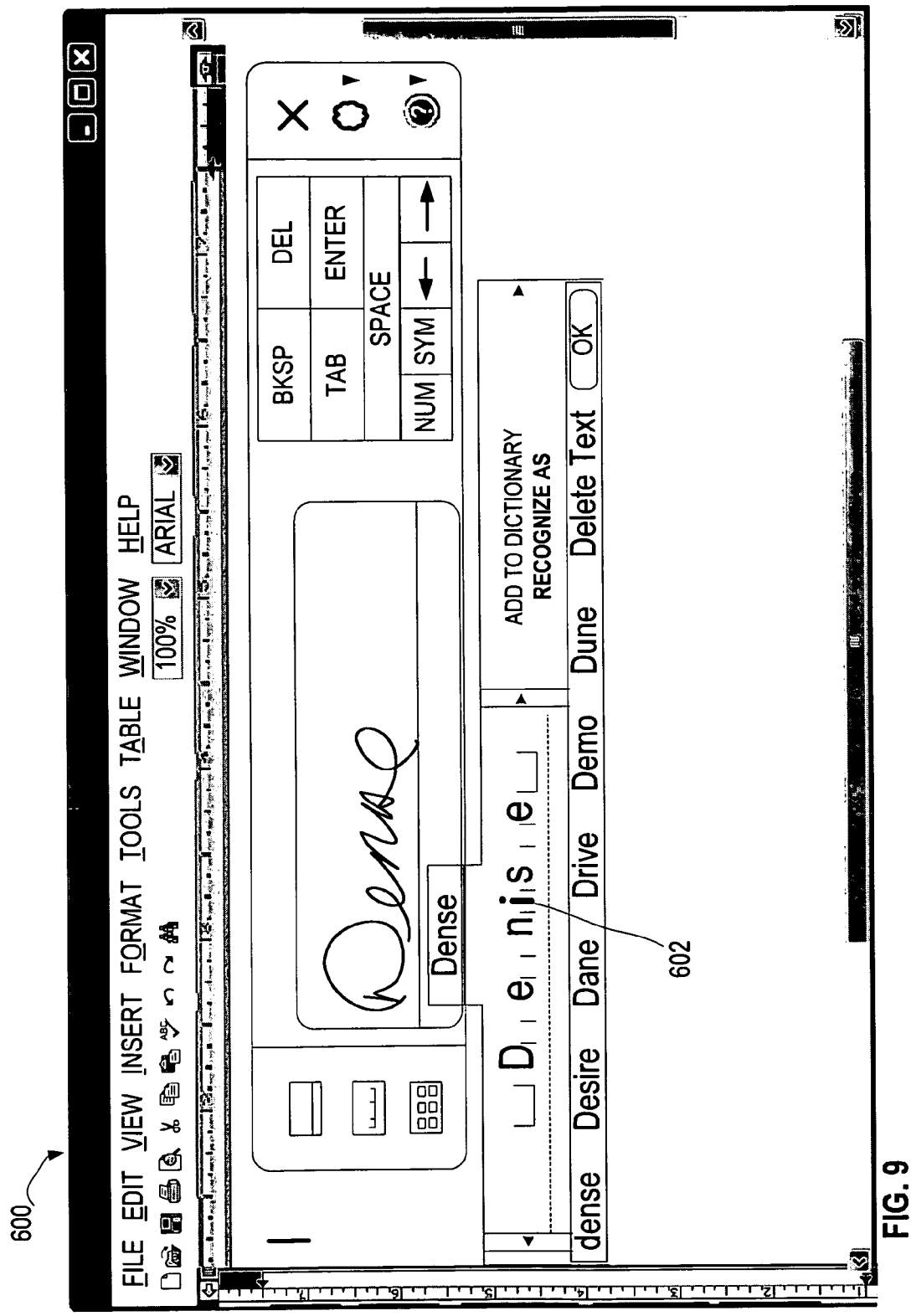
FIG. 9 is a simulated screen for one implementation of the system of FIG. 1 that illustrates performing a correction of an incorrect recognition result by manually entering the correction.

Similarly, FIG. 9 shows a simulated screen 600 of one implementation that appears when performing a correction of an incorrect recognition result by manually entering the correction. In this example, instead of selecting a choice from the list of alternates, the user manually enters a correction 602 (since the desired result was not in the list of alternates). As with the prior example, this manual correction is saved in the data store for use in future recognition decisions.

Figure 10:
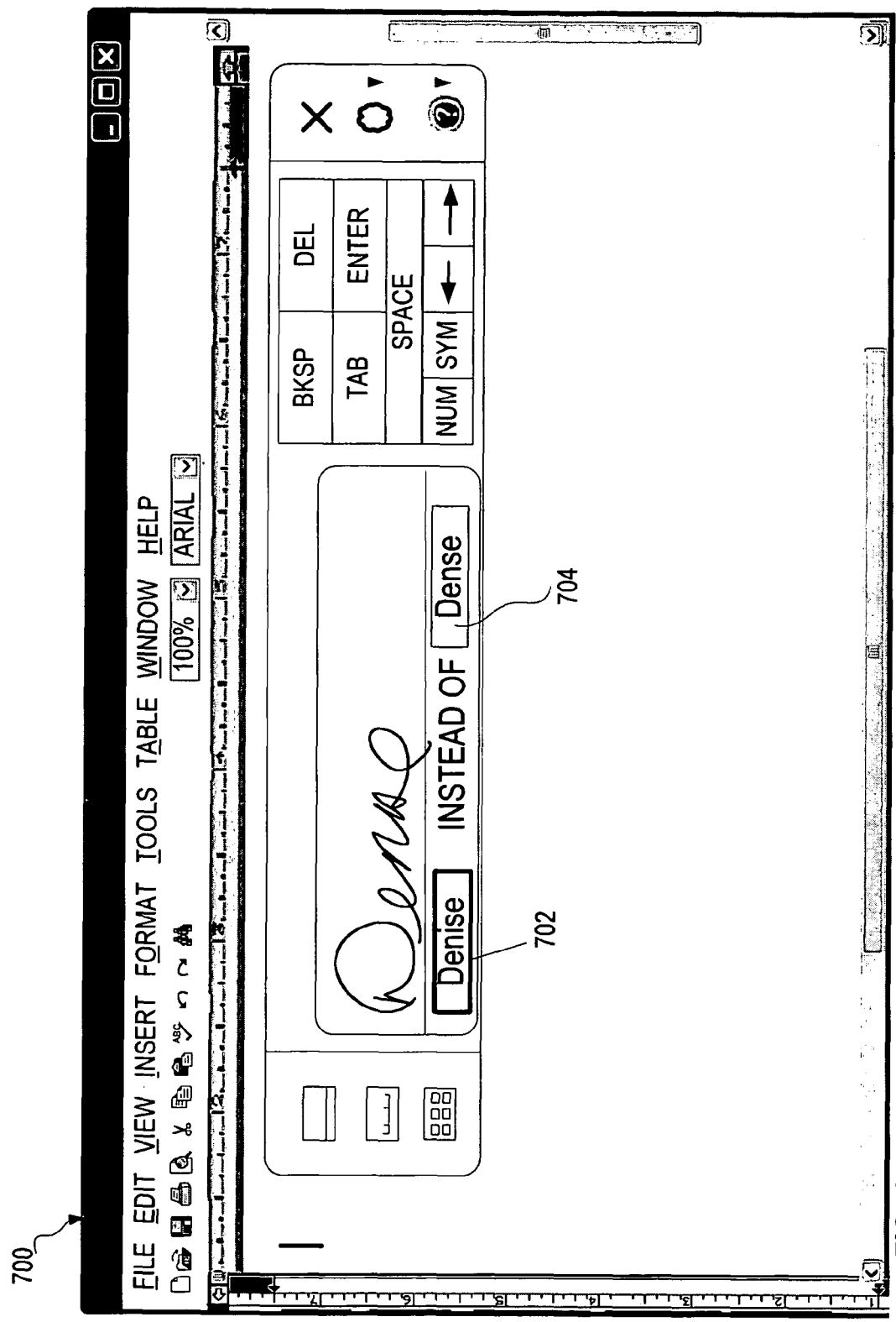
FIG. 10 is a simulated screen for one implementation of the system of FIG. 1 that illustrates automatically correcting a recognition result based on a prior correction history of the user (such as the corrections made in FIGS. 8 and 9).

FIG. 10 shows a simulated screen 700 of one implementation that appears when automatically correcting a recognition result based on a prior correction history of the user. In the example shown, the user's handwritten input for "Denise" is now properly recognized as "Denise" 702 because the user's prior correction history was considered by the recognizer and found to meet the required criteria for performing the swap. This example visually indicates that "Denise" was used instead of "Dense" 704. Other variations for visually indicating that the swap took place could also be used instead of or in addition to this non-limiting example.

Figure 11:
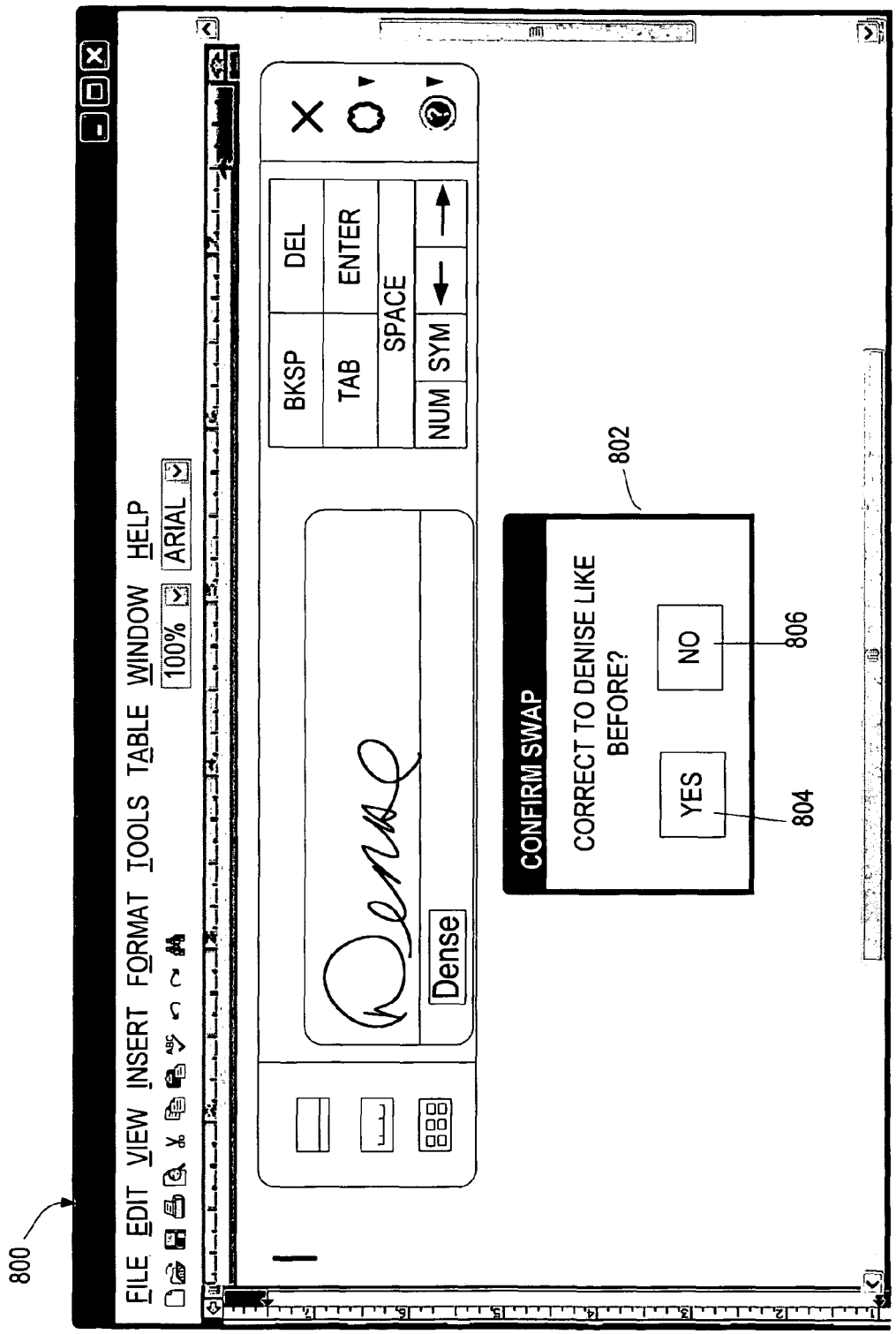
FIG. 11 is a simulated screen for one implementation of the system of FIG. 1 that illustrates prompting a user to confirm a correction to a recognition result based on a prior correction history of the user.

FIG. 11 shows a simulated screen 800 of one implementation that appears when prompting a user to confirm a correction to a recognition result based on a prior correction history of the user. In this example, the user is prompted to confirm the swap/correction before it is actually made. The confirm swap screen 802 allows the user to select Yes Option 804 to have the swap completed, and to select the No Option 806 if the user does not wish to have the swap completed.

Figure 12:
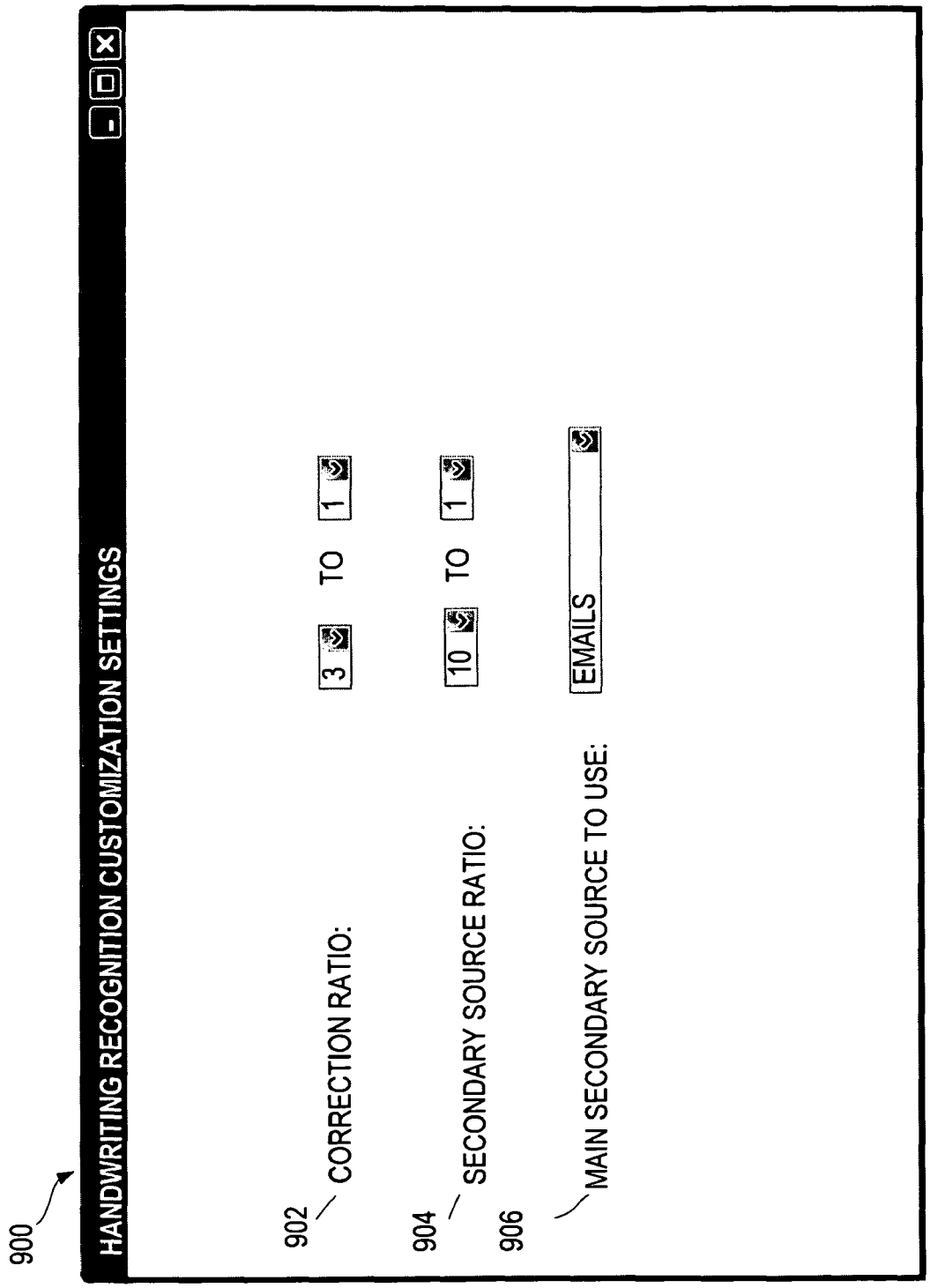
FIG. 12 is a simulated screen for one implementation of the system of FIG. 1 that illustrates allowing the user to modify one or more handwriting recognition customization settings.

Turning now to FIG. 12, a simulated screen 900 of one implementation is shown that appears when allowing the user to modify one or more handwriting recognition customization settings. The handwriting recognition customization setting screen 900 allows the user to adjust the correction ratio 902, secondary source ratio 904, and/or the main secondary source to use 906. The system then uses one or more of these settings to help determine whether a swap should be performed between a top recognized word (returned by the recognizer) and another word that the user has demonstrated to correct it to and/or use more frequently.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for using prior corrections of a user to improve recognition operations comprising:
receiving a handwritten input from a user;
performing a recognition operation to determine a top recognized word;
analyzing a history of prior corrections by the user to calculate a ratio comprising a forward quantity of corrections from the top recognized word to a particular word over a backward quantity of corrections from the particular word to the top recognized word; and if the ratio meets or exceeds a desired minimum, then swapping the particular word for the top recognized word and displaying the particular word on a display device as a recognition result.

2. The method of claim 1, wherein the history of prior corrections by the user is stored in a data store.

3. The method of claim 1, wherein the analysis comprises determining if a secondary source also reveals that the user has used the particular word a required number of times more often than the top recognized word before the swapping is performed.

4. The method of claim 3, wherein the secondary source includes a plurality of emails authored by the user.

5. The method of claim 3, wherein the secondary source includes a plurality of word processing documents authored by the user.

6. The method of claim 3, wherein the required number of times is at least 10.

7. The method of claim 1, comprising providing a visual indicator on the display device to indicate that the swapping occurred.

8. The method of claim 1, comprising providing a prompt to the user to confirm the swapping before the swapping occurs.

9. The method of claim 1, wherein the ratio is at least 3 to 1.

10. A computer-readable medium having computer-executable instructions for causing a computer to perform the method of claim 1.

11. A computer-readable medium comprising a tangible article of manufacture having computer-executable instructions for causing a computer to perform a method comprising: tracking a history of corrections made by a user to one or more recognition results; receiving a handwritten input from the user; performing a recognition operation on the handwritten input to determine a top recognized word; analyzing the history of corrections made by the user to calculate a ratio of times the user has corrected the top recognized word to a particular other word as opposed to correcting the particular other word to the top recognized word; if the ratio meets or exceeds a required minimum, then analyzing at least one secondary source to determine if the particular other word is used a certain number of times more frequently than the top recognized word in the secondary source; and if analysis of the secondary source reveals that the certain number of times is satisfied, performing a swap of the top recognized word with the particular other word.

12. The computer-readable medium of claim 11, the method comprising:

upon performing the swap, displaying the particular other word on a display device to the user.

13. The computer-readable medium of claim 11, the method comprising:

storing the history of corrections in a data store.

* * * * *